US005839807A

United States Patent [19]

Perlo

[11] Patent Number: 5,839,807

[45] Date of Patent: Nov. 24, 1998

[54] DEVICE WITH MICRO-FILTERS FOR SELECTING COLORS AND IMAGES

[75] Inventor: Piero Perlo, Sommariva Bosco, Italy

[73] Assignee: C.R.F. Societa Consortile per Azioni, Turin, Italy

[21] Appl. No.: 744,144

[22] Filed: Nov. 12, 1996

[30] Foreign Application Priority Data

Nov. 9, 1995 [IT] Italy .................................. T095A0906

[51] Int. Cl.[6] ...................................................... G03B 21/14

[52] U.S. Cl. ................................................ 353/38; 353/84

[58] Field of Search ........................ 353/38, 84; 362/293, 362/309; 345/32, 88; 359/589, 590, 578, 891

[56] References Cited

U.S. PATENT DOCUMENTS

| | | | |
|---|---|---|---|
| 3,597,069 | 8/1971 | Heinonen, Jr. | 353/84 |
| 4,294,524 | 10/1981 | Stolov | 353/84 |
| 4,924,356 | 5/1990 | French et al. | 362/293 |
| 5,285,298 | 2/1994 | Kaneko et al. | 353/84 |
| 5,623,349 | 4/1997 | Clarke | 349/106 |

*Primary Examiner*—William Dowling
*Attorney, Agent, or Firm*—Sughrue, Mion, Zinn, Macpeak & Seas, PLLC

[57] ABSTRACT

A radiation beam emitted by a polychromatic source with finite dimension is initially corrected in its vergence and distribution by a reflector or a system which operates according to refraction, diffraction, total inner reflection, effects and is incident on a matrix of micro-lenses with a square, rectangular or any other cross-section, which have the function of converging the beam towards a matrix of colored micro-filters or image micro-cells. The micro-filters or the cells corresponding to different images are two or more for each single micro-lens which is present in the matrix of micro-lenses. The dimension of the colored micro-filters is such that they intercept partially or totally the converging polychromatic beam. The selection of the color or the images is obtained by interposing the desired color in the polychromatic light beam. A movement of the plate of micro-filters enables the color or the image to be changed. The cross-section of the micro-filters and the type of micro-lenses which are used enable colored patterns with the desired light distribution to be generated.

13 Claims, 7 Drawing Sheets

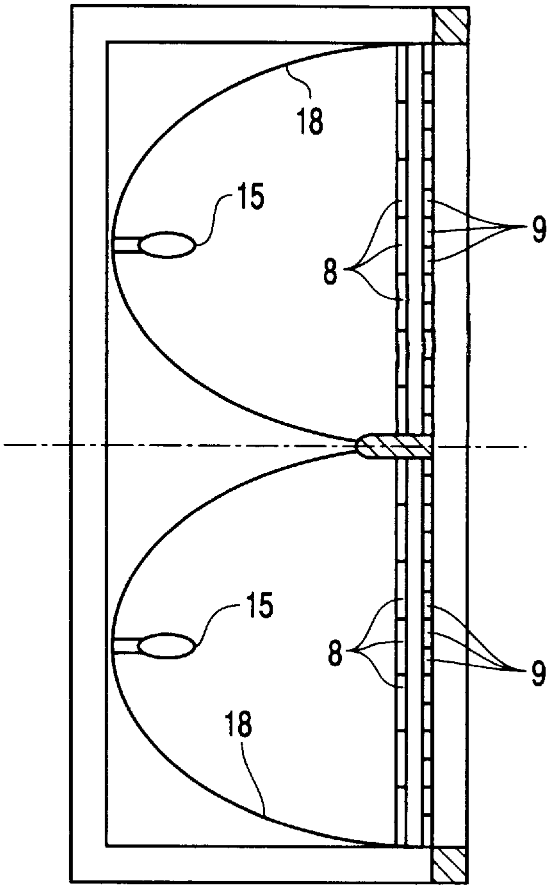
*Fig. 9A*
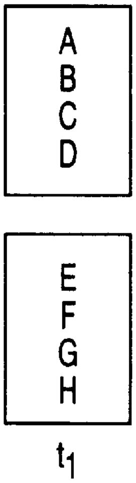
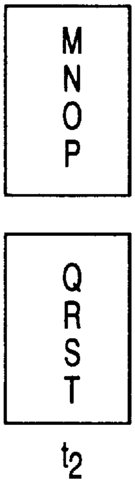
*Fig. 9B* *Fig. 9C*

DEVICE WITH MICRO-FILTERS FOR SELECTING COLORS AND IMAGES

BACKGROUND OF THE INVENTION

The present invention relates to the field of optical devices which can be used for selecting the colour or images in a polychromatic light beam.

The selection of the colour in a polychromatic light beam was always the subject of studies by illumination experts or optics experts. The best known method lies in positioning the coloured filters on the path of the light beam. To this end, the filters are usually placed on a rotating disk 1 (FIGS. 1A, 1B), driven by an electric motor 2 and including a plurality of sectors $C_1$, $C_2$, $C_3$, . . . Cn constituted by filters of different colours. In another known solution, the colour is selected with the use of a liquid crystal system 3 controlled by an electronic control device 4. This type of selection of the colour is efficient, does not require movements and can be applied, as also in the case of FIGS. 1A, 1B, both in displaying and in projecting images. The solution of FIG. 2 however implies the use of expensive materials, which are not easily available on the market, a sophisticated control electronics and finally requires high investments for its industrial exploitation.

In the field of devices for displaying images or static signals, the conventional technique usually lies in uniformly lighting a symbol formed by various means on a transparent plate. In this manner, in order to display separate signals, it is necessary to provide a symbol for each type of signal. Thus, for example, warning lights on-board of motor cars require the provision of a light source for each symbol.

Another known method lies in using mirrors able to select the colour, which for example use multi-layered optical coatings, diffraction gratings or prismatic effects or combinations thereof.

In the field of the dynamic display of images, matrices of cells are used, with each cell which can change its state, for example by means of liquid crystals, polarising filters or micro-mirrors. In all cases in which liquid crystals, diffusers and polarising filters are used, there is the problem that a narrow viewing window can not be defined. This aspect is sometimes advantageous, since enables viewing also at large angles, but many other times it is disadvantageous, since the images are visible also from positions from which they should not be visible.

In the field of the projection of static images, according to the prior art, a diapositive is uniformly lighted by a polychromatic beam and an objective projects the images on a screen. Each time that one wishes to change the image it is necessary to replace the diapositive.

SUMMARY OF THE INVENTION

The object of the present invention is that of overcoming the problems of the prior art which has been described above with relatively simple means and by using conventional materials and low cost technologies.

In view of achieving this object, the invention provides a device for selecting colours or images in a polychromatic light beam, comprising means for generating a polychromatic light beam, a plurality of micro-lenses integrated in a thin transparent plate, having the function of generating a plurality of partial polychromatic beams, a plurality of coloured micro-filters or image micro-cells, having size and cross-section adapted to the cross-section of the micro-lenses, so that to each micro-lens there correspond at least two micro-filters or micro-cells, actuator means to cause a relative movement between the micro-lenses and the coloured micro-filters or image micro-cells, which operates in such a way that a relative movement between the micro-lenses and the micro-filters enables the type of light pattern to be selected, for generating light beams or images, different with respect to shape and/or colour, and/or polarisation and/or vergence at the outlet of the device.

BRIEF DESCRIPTION OF THE DRAWINGS

The invention will be now described with reference to the annexed drawings, given purely by way of non-limiting example, in which:

FIG. 9A is a diagrammatic view in cross-section of a further application of the invention in form of light signboard, FIGS. 9B, 9C both show a front view of the light signboard of FIG. 9A in two different operative conditions.

DETAILED DESCRIPTION OF THE INVENTION

Figure 1A:
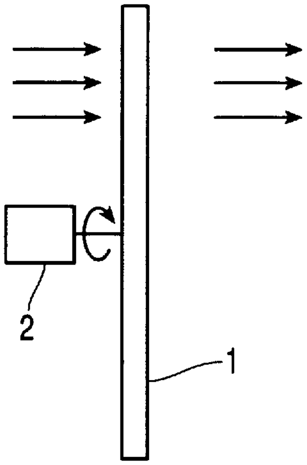
Fig. 1A Prior Art
FIG. 1A is a side view of a device for selecting the colour by a rotating coloured filter, according to the prior art.
Figure 1B:
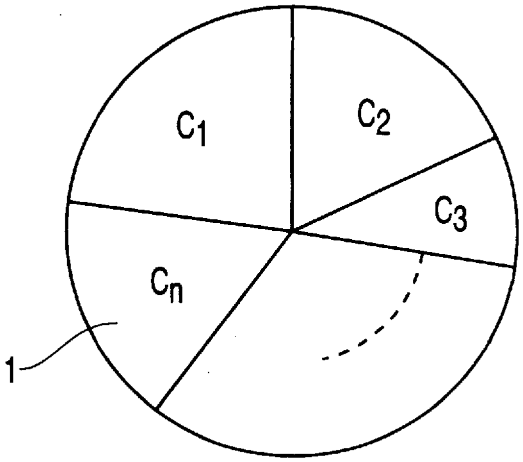
Fig. 1B Prior Art
FIG. 1B is a front view of the device of FIG. 1A, FIG. 2 diagrammatically shows a device for selecting the colour by means of liquid crystals, according to the prior art.
Figure 2:
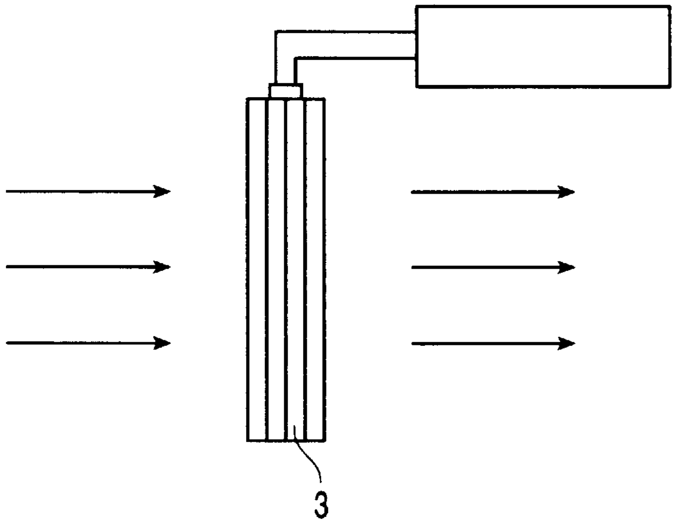
Fig. 2 Prior Art
Figure 3:
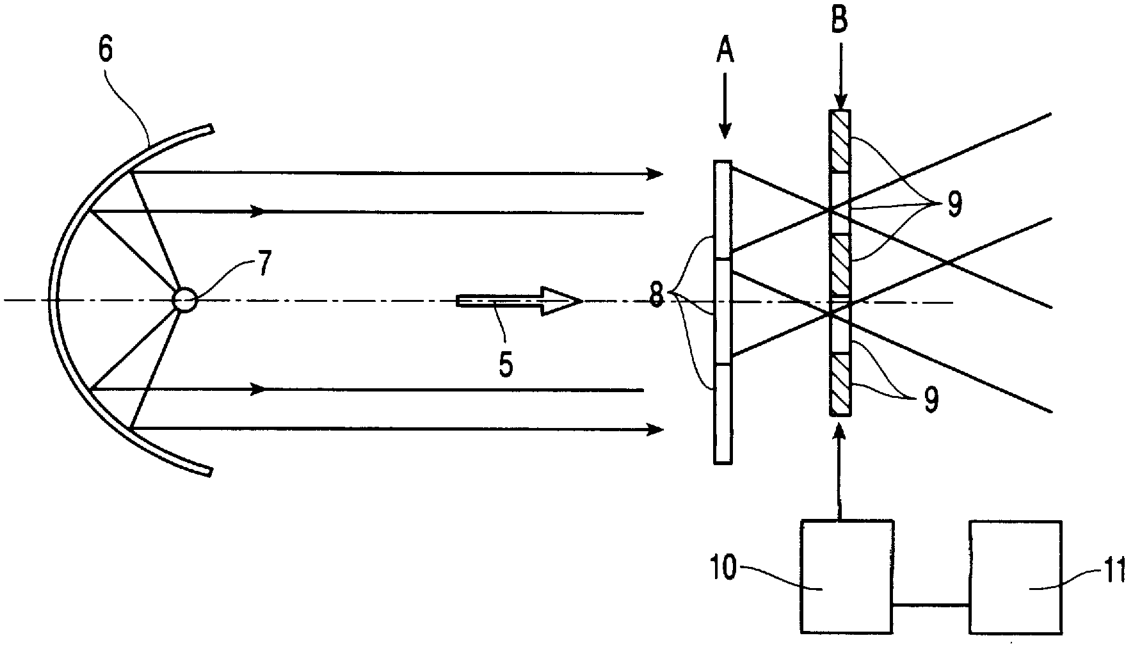
FIG. 3 shows a first embodiment of a device according to the invention, comprising a matrix of micro-lenses and a matrix of coloured filters, to each micro-lens there being associated two or more coloured micro-filters (for example four micro-filters one of which is transparent and the remaining three being respectively of red, green and blue colour)
Figure 4:
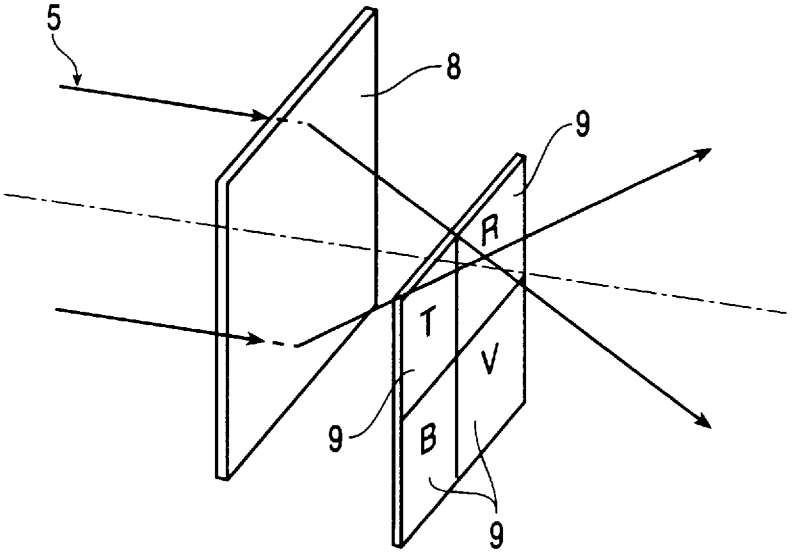
FIG. 4 is a perspective diagrammatic view of the device of FIG. 3.

With reference to FIG. 3, a polychromatic light beam 5 generated by a reflector 6 which receives light rays coming out of a source 7, is caused to converge by a matrix of micro-lenses 8. Each micro-lens 8 causes the beam portion by which it is intercepted to converge on a matrix of micro-filters 9 which select the desired colour of the beam as a result of a movement of the matrix of micro-filters 9 caused by an actuator 10 driven by an electronic control system 11. The dimensions of the micro-filters are such that the area of each micro-lens 8 is covered by a plurality of micro-filters 9. For example, if one micro-lens 8 has a square cross-section with side L, one can use square micro-filters with a side L/N with N>=2 and integer, or rectangular micro-filters with one side of length L and the other side of length L/N. In the case of square micro-filters with N=2, to each micro-lens there correspond therefore $N^2 4$ filters 9 (FIG. 4) one of which for example is transparent (designated by T in FIG. 4) and the other three being respectively of red, green and blue colour (designated respectively by R, V and B in FIG. 4). FIG. 4 shows the condition in which the portion of the beam intercepted by a micro-lens 8 converges, as a result of the selected position of the matrix of micro-filters 9, on a micro-filter R of red colour, so that the output beam is of red colour.

More generally, if the micro-lens 8 has a non-rectangular cross-section, the micro-filters will have corresponding shapes and size. The distance between micro-filters 9 and micro-lenses 8, as shown in FIG. 4, is such that the partial beam focused by each micro-lens 8 has a lower dimension than that of the intercepted micro-filter 9, and this considering also the non-collimation of the polychromatic beam directed on the micro-lenses. The micro-filters 9 can be positioned therefore either on the focal plane of the micro-lenses or in front thereof or behind it.

In the case of a matrix of micro-lenses 8 constituted by K×M micro-lenses, the matrix can be designated by $A_{k,M}$ and the single micro-lens can be identified with the term $a_{iy}$ with i=1, 2, . . . K and y=1, 2, . . . M. If the micro-lenses are all identical to each other, for example of rectangular shape, with sides L×H, and the matrix of micro-filters 9 is constituted by rectangular elements with L/N and H/S dimensions, the single micro-filter in the matrix of micro-filters 9 can be identified by the term $(f_{a,b})_{i,y}$ where indices i, y designate the corresponding micro-lens and a=1, 2, . . . N; b=1, 2, . . . S. To each micro-lens there correspond N×S micro-filters. The type of micro-filter which intercepts the partial light beam focused by a micro-lens 8 can be selected with one of the N×S possible positions. The K×M micro-lenses generate a number of K×M partial beams which pass through a number of K×M micro-filters which are identical to or different from each other. If the micro-filters which have the same indices a, b are all identical to each other, then to each position there corresponds a determined colour of the light beam. Vice versa, one can generate multi-colour beams or coloured images constituted by K×M cells (pixels). In this case the N×S possible images can be used to generate animation effects.

An obvious generalisation of the foregoing description is the use of an optical element on which the filters or images are registered according to gradual variations, rather than in discrete or digital form.

The polychromatic light beam shown in FIG. 3 can be generated either by a discharge-, or an incandescence-, or a semi-conductor-, or a solid state-, or a polymeric-, or a fluorescence- or a gas-source. The beam can be further corrected partially or totally in its vergence by an optical system which operates with free propagation or with a wave guide, by exploiting the reflection effects, as in FIG. 3, or according to known systems, which operate with refraction, total inner reflection, diffraction or with combinations thereof.

The matrix of micro-lenses 8 can be constituted by refractive, diffractive, hybrid diffractive-refractive lenses, or lenses with radial or volume variation of the refraction index. The base material for the matrices of micro-lenses can be plastic material or glass-based material and provided with anti-reflective coatings in form of thin films, or diffractive films in order to improve the efficiency of the light beam transmission.

Figure 5:
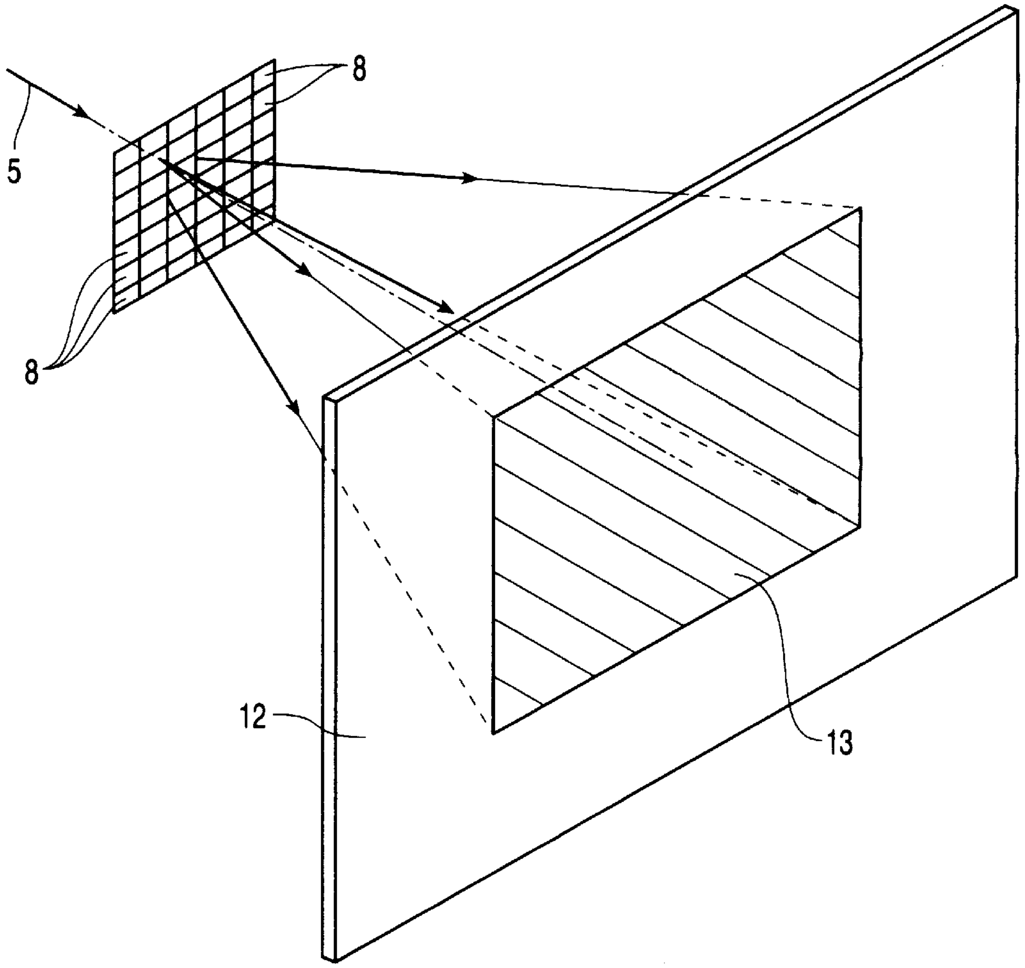
FIG. 5 is a perspective diagrammatic view which shows matrices of micro-lenses able to generate a beam with a rectangular cross-section.
Figure 6:
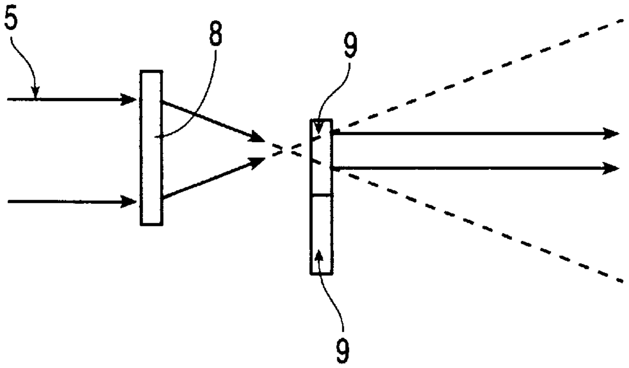
FIG. 6 is a diagrammatic side view which shows the combination of a matrix of micro-lenses with micro-filters provided with curvature.

The single micro-lens 8 can have a rhomboid, hexagonal, rectangular or square cross-section, as shown in FIG. 4, with a phase function of a spherical lens or more generally such that alone or in combination with the adjacent micro-lenses, due to diffractive effects or combined diffractive-refractive effects, it can generate beams with controlled divergence and light distribution. One example is shown in FIG. 5, where the polychromatic beam 5, incident on the matrix of micro-lenses 8, with a rectangular cross-section, is distributed again over a screen 12, with a rectangular cross-section having a high uniformity in the intensity distribution. The micro-filters (not shown in FIG. 5) interposed between the screen 12 and the micro-lenses 8 adjacent to the foci thereof, locally select the colour of the rectangular projection 13. To the distribution of intensity and the vergence of the light beam there can contribute also the micro-filters in case they are provided with a curvature and behave on their turn as micro-lenses as shown in FIG. 6. On the micro-filters or the micro-cells constituting one element of an image is further possible to introduce a micro-prism or a diffractive element which directs the beam in a pre-determined direction.

The micro-lenses 8 and the micro-filters 9 can be arranged according to linear matrices as shown for example in FIG. 3, or along circles or spirals, or also according to any other arrangement which enables the type of light beam or image coming out of the combination of micro-lens and micro-filters to be selected through a movement, a rotation, an inclination or a combination of these movements between the micro-lenses 8 and the micro-filters 9. The relative movement between the micro-lenses 8 and the micro-filters 9 can be applied either to the micro-lenses 8 or the micro-filters 9, mechanically, electro-mechanically, by piezoelectric-, electrostatic-, polymeric- or other different actuators, as desired.

By activating and de-activating quickly the filters of the primary colours with different timings, one can fool the eye-brain system giving the impression that one colour is active which is not actually included among the filters. In fact, by acting on the activation time ti of the single primary colour, the colour perceived can be selected by applying known concepts of colorimetry and photometry. According to a first approximation, the perceived colour can be expressed by the sum Rt1+Vt2+Bt3 where R, V, B are the red, green and blue primary colours, and ti is the activation time of the colour.

Figure 7:
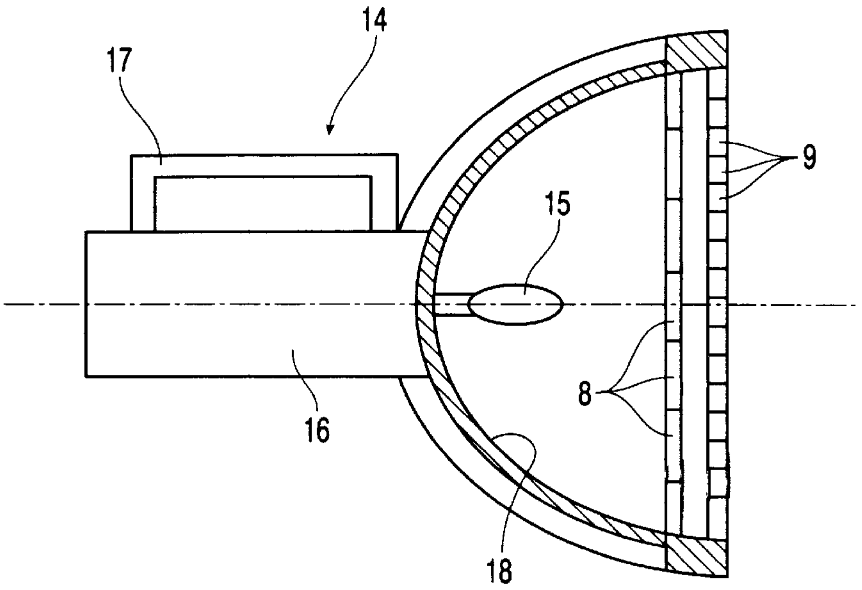
FIG. 7 is a diagrammatic and partially cross-sectional view of a signal lighting system embodied as an electric portable lamp for emergency signals.

In FIG. 7 there is shown a portable device 14 for emergency signals. The light beam generated by a source 15 supplied by a battery contained within a casing 16 provided with a handle 17, reaches the micro-lenses 8, to some extent directly and for the most part by reflection on a reflector 18. The micro-lenses 8 divide the beam into a plurality of converging light beams. These beams are intercepted by the matrix of micro-filters 9. The relative movement between the matrix of micro-lenses 8 and the matrix of micro-filters 9 is actuated mechanically or electrically and enables the selection of the type of colour, shape or image which is to be signalled.

Figure 8A:
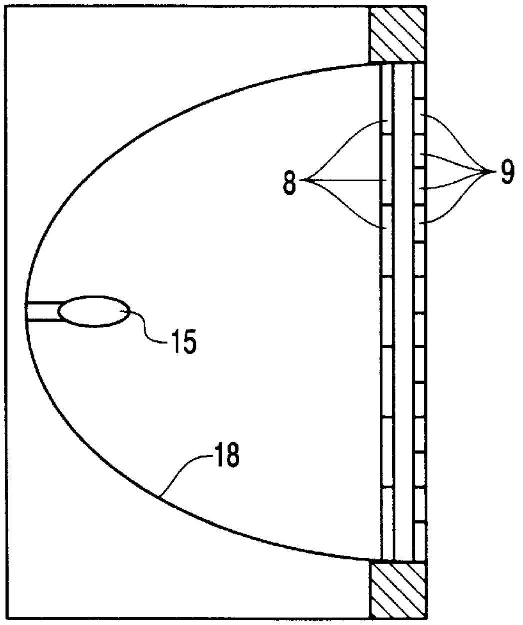
FIG. 8A is a diagrammatic view in cross-section of a further application of the invention in form of a road traffic light.
Figure 8B:
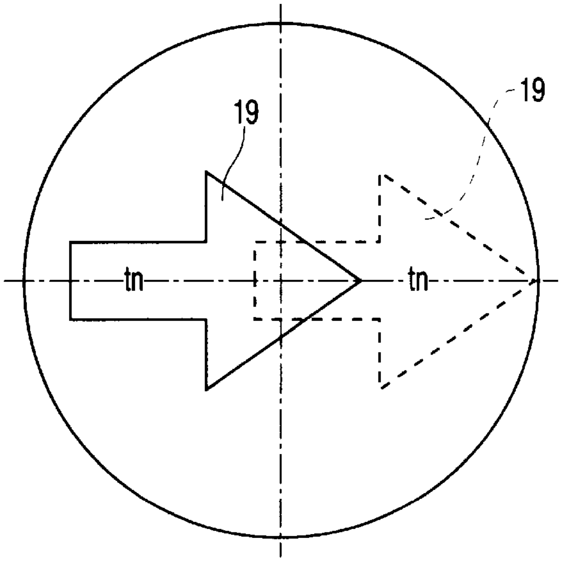
FIG. 8B is a diagrammatic front view of the traffic light of FIG. 8A.

According to a system similar to that shown in FIG. 7, it is possible to provide a further embodiment constituted by the traffic light shown in FIGS. 8A, 8B. In this figure, parts corresponding to those of FIG. 7 are designated by the same reference numeral. With reference to FIGS. 8A, 8B, by using for example four micro-filters 9 for each micro-lens 8, and using for example the colours green, red and yellow, beams of the three corresponding colours and the bi-coloured green-yellow beam are generated. By increasing the number of micro-filters it is possible to introduce direction arrows 19 (FIG. 8B) and/or other signals. By moving the micro-filters a flashing effect can be introduced both with respect to colours and signs. It is further possible to quickly alternate colours and signs creating new and more ergonomic forms of flashing signals. In FIG. 8B, by undotted line and dotted line there are indicated the two positions in which an arrow 19 is displayed respectively at times t1 and tn, so as to provide an animated effect from time t1 to time tn.

By the device shown in FIGS. 8A, 8B, the traffic light is constituted by a single source which can be turned ON continuously and a single reflector. A much more light and simple structure is thus obtained with respect to the conventional devices, which are typically constituted by at least three separate elements and a system for controlling the switching on and off of the sources. The problem due to the sun light which enters into the conventional devices through the coloured filters thus rendering difficult the active colour or signal to be distinguished from those which are de-activated, is totally overcome.

FIGS. 9A, 9B, 9C show an example of a device equivalent to a light signboard in which the messages can be varied both with respect to images and colours. In the case shown, the light signboard is particularly large and is constituted by an assembly of base devices as those shown in FIGS. 3, 4, 7, 8A, 8B. FIGS. 9B, 9C show the two different images displayed in two different times t1 and t2.

Figure 10:
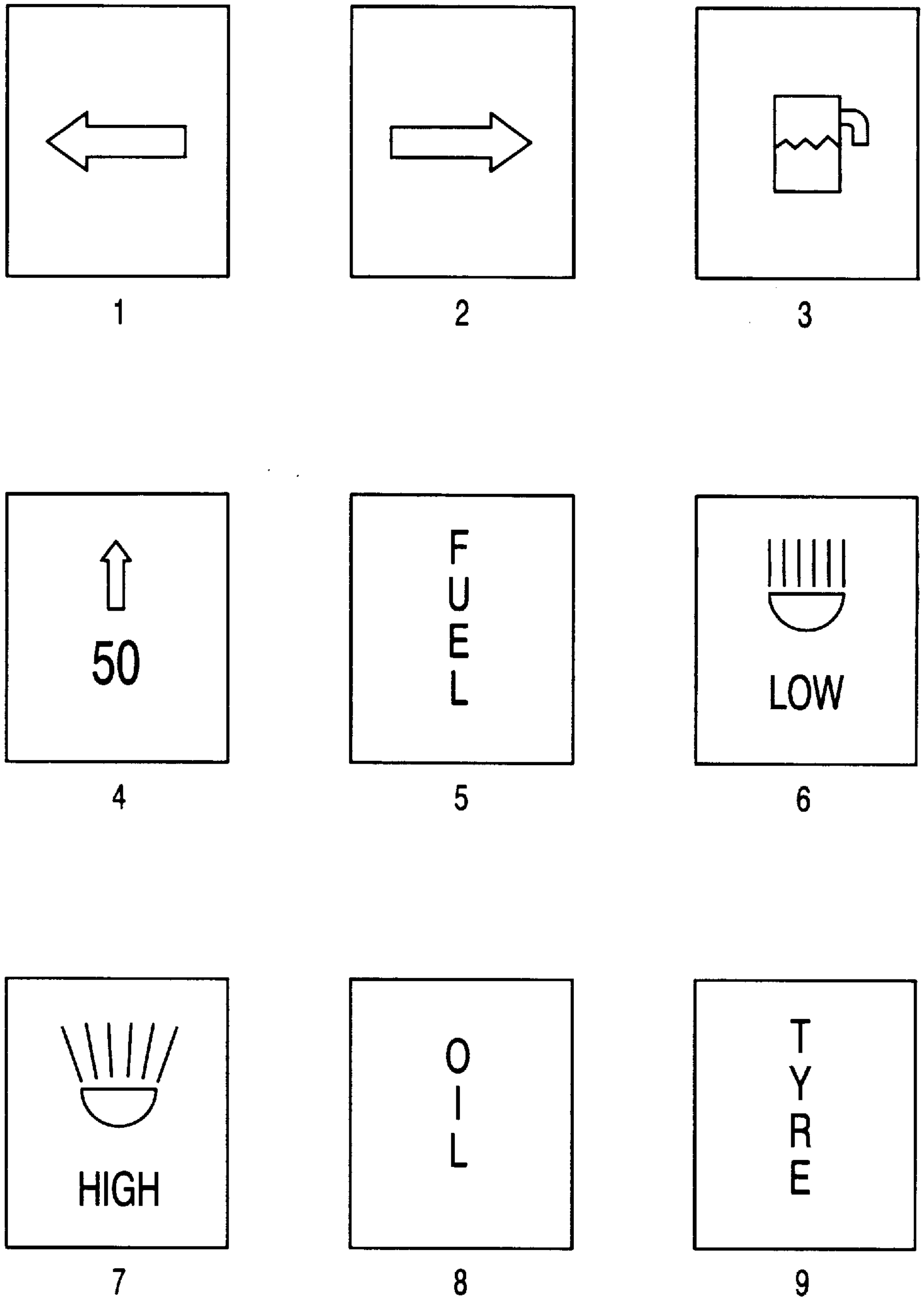
FIG. 10 is a front diagrammatic view of a further embodiment using static and animated images.

In FIG. 10 there is shown a system for displaying nine static images. A matrix of 512×512 square micro-lenses of L size is followed by a matrix of square micro-filters of L/3 side. The area of each micro-lens has nine micro-filters in correspondence thereof, having different or in part identical colours. On the micro-filters there are registered nine images of 512×512 cells (pixels) in which the colours can be all identical to generate monochromatic images, or of any colour to generate polychromatic images. The desired image is selected by applying a relative movement between the micro-filters 8 and the micro-lenses 9. An animation effect can be easily generated by selecting in sequence images which are slightly different from each other according to methods known in the field of cartoons.

In general, in devices of this type, if the coloured micro-filters are also diffusers, the images are clearly visible also viewing the plane of the micro-filters at a large incidence angle. Vice versa, if the micro-filters transmit partial beams without diffusing light, the angle at which the images on the plane of the coloured micro-filters are visible is defined by the numeric aperture of the micro-lenses. This latter case is particularly interesting each time that there is the object of limiting the viewing angle. Application examples are constituted by the road signs and signs on-board of vehicles.

Figure 11:
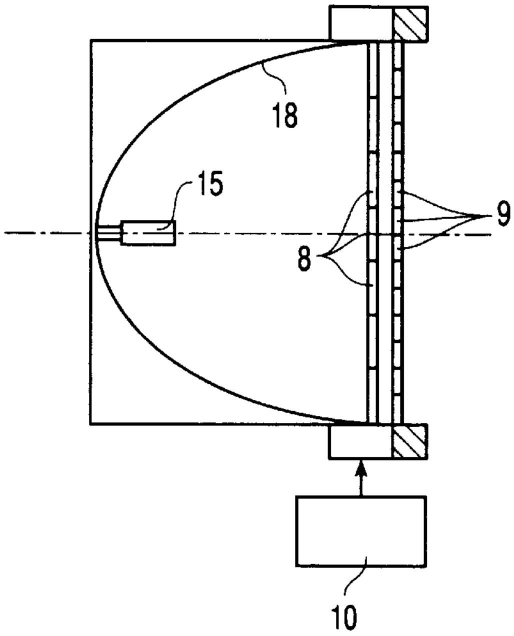
FIG. 11 is a diagrammatic view of a further embodiment constituted by a lighting device for motor-vehicles.

In FIG. 11 there is shown a lighting system for vehicles in which a portion of the light beam passes through the micro-lenses and the micro-filters. In this case the combination micro-lenses-micro-filters 8, 9 can be used to signal danger situations, such as by intermittent different coloured signals. One can include brake signals or signals of a change of direction. The beam passing through the micro-filters can be superimposed to the conventional light pattern, in order to project coloured patterns at specific areas or directions in order to qualify the type of vehicle. The combination of the two matrices can be used to shape the light beam as a function of speed, steering angle, weather conditions or outside light conditions.

Figure 12:
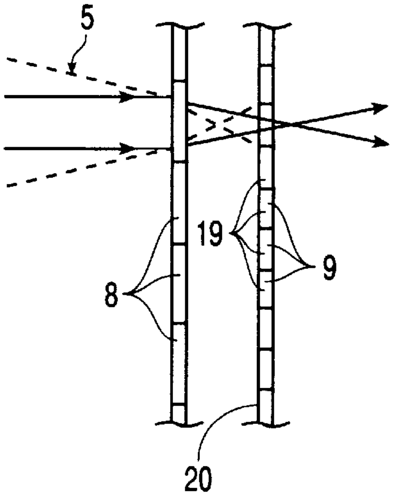
FIG. 12 is a diagrammatic side view of micro-filters placed after the focal plane of the micro-lenses and including a space filter.

FIG. 12 shows an arrangement in which between the matrix of micro-filters 9 and the matrix of micro-lenses 8 there is inserted a matrix of space filters or Fourier-type filters. The space filters are constituted by holes 19 or more generally by apertures with a pre-determined size and shape, engraved on a reflecting or absorbing layer or generally a damping layer. The apertures located adjacent to the focus of micro-lenses 8 have the function to select the portion of the light beam having an undesired direction. In fact, the rays incident on the micro-lenses beyond a given pre-determined angle are reflected or absorbed or damped by the coating 20. The introduction of space filters 19 contributes in this manner to the clearness and the directionality of the light pattern coming out of the device. The space filters 19, without any limit, can be arranged on the face of the matrix of micro-filters 9 facing towards the light source, or on the face of the matrix of micro-lenses 8 which is more remote with respect to the light source and can be in an identical number to that of the micro-filters and centered therewith.

Figure 13:
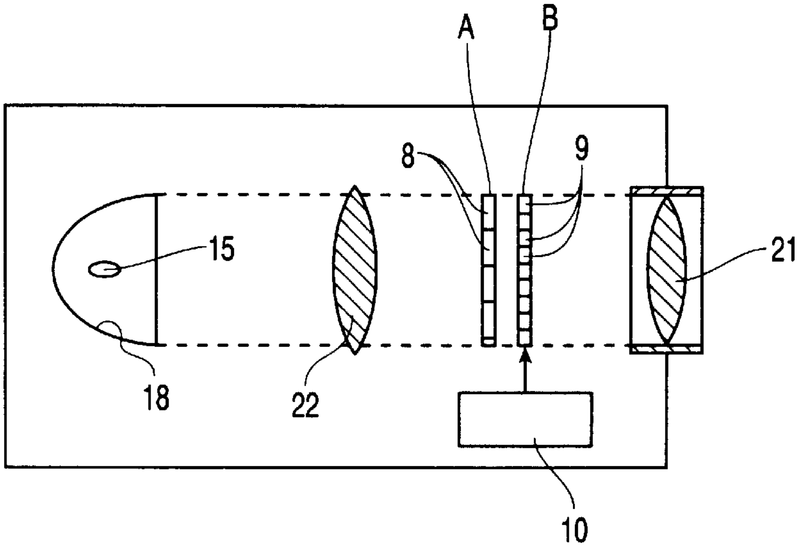
FIG. 13 is a diagrammatic view of the device for projecting images with reference to the example of a multi-image diapositive.

In FIG. 13 there is shown a device for projecting images or light patterns of a pre-determined cross-section. Downstream (with reference to the direction of the light beam) of the micro-lenses (8) and micro-filters (9) there is placed an objective 21 which has the function of projecting the light pattern coming out of the micro-filters 9 on a screen. A further lens 22 is arranged upstream of micro-lenses 8. In the most general case, the device operates as a modified diapositive projector, in which a matrix of micro-lenses has been inserted and the diapositive (constituted by the matrix of micro-filters 9) has registered thereon throughout its whole extension a plurality of images which can be selected by applying a relative movement between the micro-filters and the micro-lenses.

Naturally, while the principle of the invention remains the same, the details of construction and the embodiments may widely vary with respect to what has been described and illustrated purely by way of example, without departing from the scope of the present invention.

What is claimed is:

1. Device for selecting colours or images in a polychromatic light beam, comprising:

means for generating a polychromatic light beam, a plurality of micro-lenses integrated in a thin transparent plate, having the function of generating a plurality of partial polychromatic beams, a plurality of coloured micro-filters or image micro-cells, having size and cross-section adapted to the cross-section of the micro-lenses, so that to each micro-lens there correspond at least two micro-filters or micro-cells, actuator means to cause a relative movement between the micro-lenses and the coloured micro-filters or image micro-cells, which operates in such a way that a relative movement between the micro-lenses and the micro-filters enables a light pattern to be selected for generating light beams, having different characteristics comprised of at least one of shape, polarisation and vergence at the outlet of the device.

2. Device according to claim 1, wherein the micro-lenses and the micro-filters or micro-cells are arranged according to a matrix comprised of at least one of a circle pattern and a spiral pattern for which the filters enables the type of pattern registered on the micro-filters or image micro-cells to be selected.

3. Device according to claim 1, wherein the micro-lenses are constituted by a matrix of K×M converging micro-lenses with a rectangular cross-section of L, H sides and the micro-filters or micro-cells are N×S in number and have sides L/N, and H/S, where K, M, N, S are integers greater than 1.

4. Device according to claim 1, wherein said device is made in form of a generator of static images selected by varying the relative position between the micro-lenses and the micro-filters or micro-cells.

5. Device according to claim 1, wherein said device is made in form of a generator of animated images, which are obtained by selecting in sequence images which are slightly different from each other.

6. Device according to claim 1, wherein said micro-lenses are adapted to control the shape, the cross-section, the vergence and the direction of the light beam, whereas the micro-filters are adapted to select the colour and the polarisation of the single partial beam.

7. Device according to claim 1, wherein it is adapted to be used as a part integrated in a lighting system of a motor-vehicle including a projector able to signal danger situations with coloured intermittent beams, a brake sign, a sign of a change of direction, and able to qualify the motor-vehicle without affecting the performance of the lighting system.

8. Device according to claim 1, wherein it is made in form of a portable emergency lamp, in which a signal is generated by varying the colour of the beam emitted by the application of the relative movement between the micro-filters and the micro-lenses.

9. Device according to claim 1, wherein it is made in form of a traffic light, in which colours, direction signals, and flashing effects are obtained by a single source.

10. Device according to claim 1, wherein it is made in form of a road sign board able to select both the type of sign, and also the angular direction of possible viewing by means of prismatic or diffractive effects applied to each cell which generates the signal.

11. Light sign board comprising an assembly of devices wherein each device is according to claim 1.

12. Image projector made by a device according to claim 1, said projector comprising an objective for focusing on a screen and provided with a matrix of micro-lenses and a matrix of micro-filters constituting a diapositive having registered throughout its extension plurality of different images, the selection of the image being obtained by applying a relative movement between the diapositive and the matrix of micro-lenses.

13. Device according to claim 1, wherein it is adapted in order that the partial polychromatic beams generated by the micro-lenses intercept totally or in part the micro-filters located adjacent to the focus of the micro-lenses.

* * * * *